United States Patent [19]

Andrieu et al.

[11] Patent Number: 5,140,289
[45] Date of Patent: Aug. 18, 1992

[54] COMBINED MICROWAVE AND OPTIC ROTARY JOINT

[75] Inventors: Francois Andrieu, Lardy; André Jacquemet, Villebon; Philippe Gerard, Cachan, all of France

[73] Assignee: Thomson-CSF, Puteaux, France

[21] Appl. No.: 699,169

[22] Filed: May 13, 1991

[30] Foreign Application Priority Data

May 22, 1990 [FR] France ................... 90 06385

[51] Int. Cl.$^5$ .................... H01P 1/06; G02B 6/36
[52] U.S. Cl. ..................... 333/256; 333/261; 385/26
[58] Field of Search ............ 333/256, 257, 261; 385/25, 26

[56] References Cited

U.S. PATENT DOCUMENTS

| | | | |
|---|---|---|---|
| 4,298,850 | 11/1981 | Pellerin et al. | 333/257 |
| 4,398,791 | 8/1983 | Dorsey | 385/26 |
| 4,529,986 | 7/1985 | d'Auria et al. | 385/25 X |

FOREIGN PATENT DOCUMENTS

| | | |
|---|---|---|
| 0107035 | 5/1984 | European Pat. Off. . |
| 61110105 | 11/1984 | Japan . |
| 61-213806 | 3/1985 | Japan . |

Primary Examiner—Paul Gensler
Attorney, Agent, or Firm—Marmorek, Guttman & Rubenstein

[57] ABSTRACT

This combined microwave and optic rotary joint has a fixed part and a rotating part in rotation about an axis $\underline{A}$ in relation to the fixed part. It has at least one pair of microwave guide inputs, one of which is positioned in the fixed part while the other is positioned in the rotating part, these microwave guide inputs being coupled to each other by a coaxial link that is fixedly joined to the rotating part and placed in a conduit going through the fixed and rotating parts along the rotation axis $\underline{A}$. The core of the coaxial link is drilled with a longitudinal channel enabling the passage of an optic fiber fixedly joined to the rotating part. The end of this optic fiber goes through the fixed part and emerges in a case where it is coupled through an optic rotation plane to the end of another optic fiber fixedly joined to the fixed part.

7 Claims, 2 Drawing Sheets

COMBINED MICROWAVE AND OPTIC ROTARY JOINT

BACKGROUND OF THE INVENTION

1. Field of the Invention

The present invention relates to waveguide rotary joints enabling the transmission of microwave signals, for example between a high-frequency radar head placed in a turret rotating about a frame and other circuits of the radar housed in the frame.

This type of microwave rotary joint is generally associated with an electrical rotary joint with slip-ring collector enabling the electrical supply, from the frame, to the instruments placed in the turret, and the exchange of various electrical information signals between the instruments housed in the turret and those housed in the frame.

2. Description of the Prior Art

The transmission of electrical information signals by means of the slip-rings of the collector of the electrical rotary joint is difficult because such transmission is sensitive to the parasites generated by brushes and by the proximity of the supply currents. It calls for many precautions:
- contacts by several brushes
- protection against oxidation in order to prevent contact defects;
- careful distribution of the power slip-rings on the collector in order to restrict parasitic interference with the electrical information signals and, in the event of mechanical malfunctioning, to prevent a possibility of contact between the power slip-rings and the wires conveying the electrical information signals;
- arrangements have to be made for a high quality ground return.

The effect of all these precautions is to make the electrical rotary joint heavy and bulky. Furthermore, the throughput rate possible for information exchanges by means of an electrical signal remain limited. This may entail a great increase in the number of communication channels and a further increase in the bulk of the electrical rotary joint.

The present invention is aimed at overcoming these drawbacks by providing for the association of the microwave rotary joint with an optic rotary joint having an optic fiber.

The use of a link by optic fiber and optic rotary joint has the advantage of enabling a mode of transmission of information signals that is insensitive to parasitic phenomena and to parasitic noises from the power slip-rings. Furthermore, the transmission rate may attain far greater values.

SUMMARY OF THE INVENTION

An object of the present invention is a combined microwave and optic rotary joint having:
- a part known as a fixed part,
- a part known as a rotating part in rotation about an axis $\underline{A}$ in relation to the fixed part,
- at least one pair of microwave guide inputs, one of which is positioned in the fixed part while the other is positioned in the rotating part, these microwave guide inputs being coupled to each other by a coaxial link placed along the rotation axis $\underline{A}$, said coaxial link being provided with a conductive core that has a first end fixed in the rotating part and a second end sliding rotationally in the fixed part,
- an optic fiber fixedly joined to the rotating part, that penetrates said rotating part and goes through the conductive core of the coaxial link in the longitudinal direction along a channel made along the rotational axis $\underline{A}$ in the direction of the fixed part,
- and an optic coupling means that is fixedly joined to the fixed part and is centered on the rotation axis $\underline{A}$ facing the end of the optic fiber that is fixedly joined to the rotating part.

BRIEF DESCRIPTION OF THE DRAWINGS

Other features and advantages of the invention shall emerge from the following description of an embodiment given by way of an example. This description is made with reference to the drawings, of which.

DETAILED DESCRIPTION OF THE INVENTION

Figure 1:
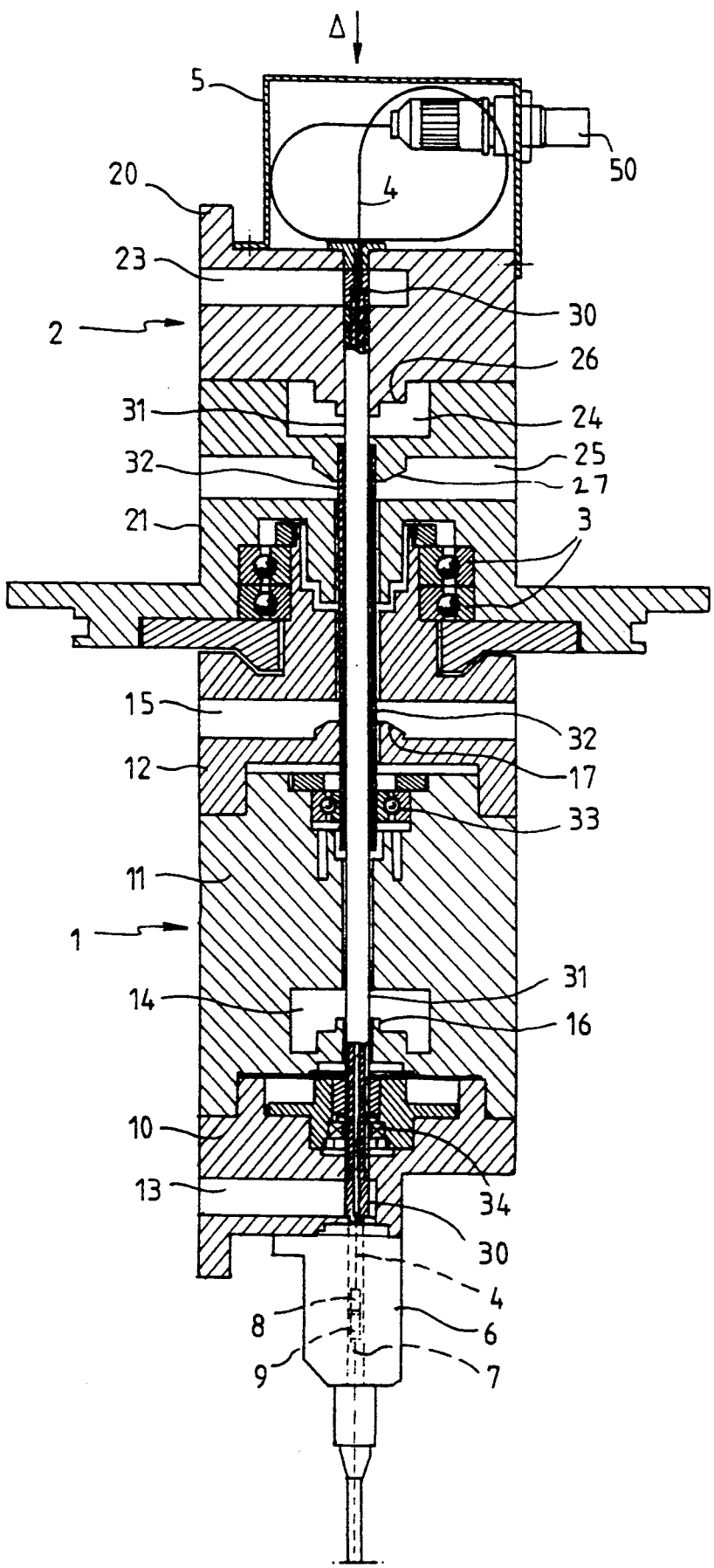
- FIG. 1 is a partial view in longitudinal section of combined microwave and optic rotary joint according to the invention.

The combined rotary joint shown in FIG. 1 provides for the routing of three distinct microwave channels and one optic channel. It has two superimposed parts, one of them rotating with respect to the other. One of these parts, referenced 1, is said to be fixed while the other part, referenced 2, is said to be rotating.

The fixed part 1 and rotating part 2 are coupled by means of ball bearings 3 enabling one of them to rotate with respect to the other about a common, vertical, longitudinal axis $\underline{A}$.

The fixed part 1 is formed by a stacking of three metal parts 10, 11, 12, drilled with an axial conduit centered on the rotation axis $\underline{A}$ and three superimposed, lateral inputs 13, 14, 15 of rectangular waveguides meeting the axial conduit.

The rotating part 2 is formed by two metal parts 20, 21, one placed on top of the other, these two metal parts being drilled with an axial conduit centered on the axis of rotation $\underline{A}$ and three superimposed lateral inputs 23, 24, 25 of rectangular waveguides meeting the axial conduit.

A coaxial link placed in the axial conduits of the fixed part 1 and rotating part 2 provides for the coupling between the waveguide inputs of the fixed part 1 and rotating part 2 corresponding to a same channel. It has three concentric conductors: a core 30 and two conductive sheaths 31 and 32, insulated from one another and from the wall of the conduits. The core 30 interconnects the waveguide inputs 13 and 23, of the fixed part 1 and rotating part 2, that are farthest from each other. The ends of this core 30 extend into these inputs like an antenna, to provide for the microwave couplings. The first conductive sheath 31, which is shorter than the core 30, electrically connects two coupling obstacles 16, 26 having 'olive button' (stair-shaped) profiles which protrude into the cavities of the intermediate waveguide inputs 14 and 24 of the fixed part 1 and rotating part 2 to provide for their microwave coupling. The second conductive sheath 32, which surrounds the first conductive sheath 31 and the core 30, is shorter than these elements 31 and 30. It electrically connects two coupling obstacles 17 and 27, having 'olive button'

(stair-shaped) profiles which protrude into the cavities of the waveguide inputs 15 and 25, closest to each other, of the fixed part 1 and rotating part 2, to provide for their microwave coupling. The coaxial link is fixed by one end to the rotating part 2 and slides rotationally in the fixed part 1 where its guidance is ensured by two ball bearings 33 and 34.

In each microwave channel, the signal gets propagated in fundamental TE10 mode in the waveguide inputs and in TEM mode in the coaxial link where the propagation takes place by the concentric conductors 30, 31, 32 by skin effect. It is the symmetry of this TEM mode that permits the rotation.

The core 30 of the coaxial link is drilled with an axial channel centered on the rotational axis Δ. This axial channel enables the passage of an optic fiber 4 through the rotating part 2 and fixed part 1. This optic fiber 4, which is fixedly joined to the rotating part 2 and the coaxial link, comes from an upper case 5 fixed to the rotating part 2 where it is connected to an optic connector element 50. It emerges beneath the fixed part 1 in a lower case 6 fixed to this part 1 where its end is coupled with that of another fiber 7 by means of coupling lenses 8 and 9 widening the light beam right on an optic rotation plane to attenuate the effects of the faults of alignment and distance of the ends of the two fibers 4 and 7, one rotating with respect to the other.

Figure 2:
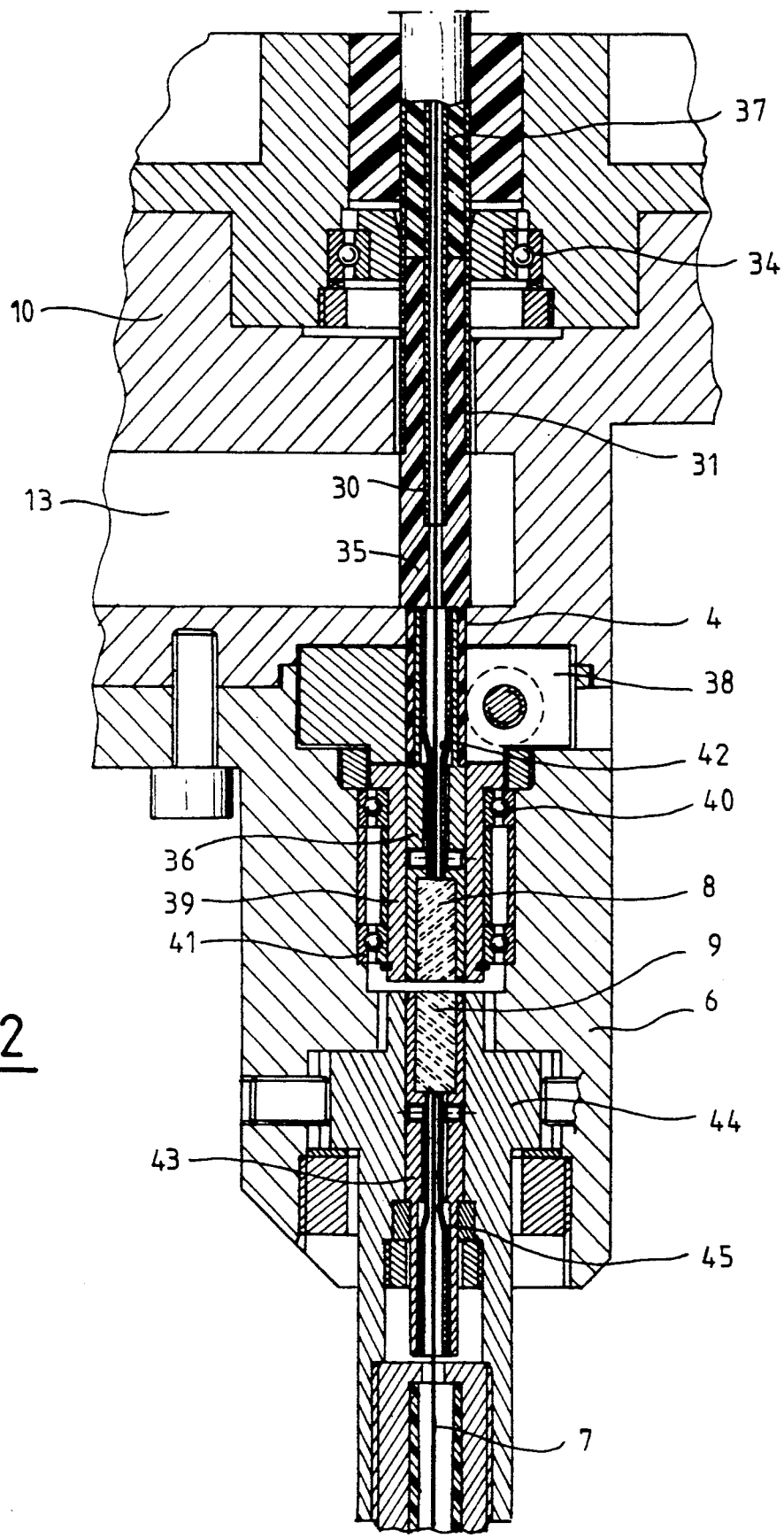
- FIG. 2 is a view in longitudinal section, showing, in detail, the lower part assigned to the optic coupling of the combined rotary joint seen in FIG. 1.

FIG. 2 gives a detailed view of the constitution of the combined rotary joint at the lower case 6 fixedly joined to the fixed part 1, which contains the rotation plane of the optic link. This figure shows

- the metal part 10 which constitutes the lower part of the fixed part 1 and has, going through it, an axial conduit centered on the rotation axis $\underline{A}$ and the waveguide input 13,
- the lower part of the coaxial link, threaded into the coaxial conduit with its first metal sheath 31 which stops at the outlet of the coaxial conduit into the waveguide input 13, and the end of its metal core 30 which extends, like an antenna, into the waveguide input 13, as well as the lower ball bearing 34 which provides for the guidance, in rotation, of the coaxial link within the fixed part 1.

The coaxial link is extended into the interior of the lower case 6 which is fixedly joined to the fixed part 1 up to the optic rotation plane. This extension is done by a hollow rod supporting the coupling lens 8 at its end. This hollow rod is formed by an insulating sleeve 35 extended by a hollow tip 36. The insulating sleeve 35 has its end fitted between the core 30 and the first metal sheath 31, and extends the tubular insulator 37 that separates them. It enables the crossing of the lower wall of the metal part 10 and penetrates the lower case 6. The tip 36 has its end fitted into the insulator sleeve 35 and fixed to it by a clamping collar 38. It is positioned in a bushing 39, rotationally guided within the lower case 6 by two superimposed ball bearings 40 and 41. At its free end, it bears the coupling lens 8 and contains a tubular centering part 42 used to guide the optic fiber 4 along the axis of the coupling lens 8.

The optic fiber 4 is coupled to the connector element 50, fixed to the upper case 5 that is fixedly joined to the rotating part 2. From the upper casing 5, this optic fiber 4 follows the axial channel of the core 30 of the coaxial link and continues its path within the insulator sleeve 35 and the tubular centering part 42 to come into contact with the coupling lens 8.

The coupling lens 9 is placed so as to be facing the coupling lens 8, on the other side of the optic rotation plane. It is borne by a tip 43 fitted into an anchoring part 44 that provides for its fixing to the lower case 6 that is fixedly joined to the fixed part 1. This tip 43 encloses a tubular centering part 45 that guides the end of the optic fiber 7 which is fixedly joined to the fixed part 1 on the axis of the coupling lens 9.

What is claimed is:

1. A combined microwave and optic rotary joint having:
   - a part known as a fixed part,
   - a part known as a rotating part in rotation about an axis $\underline{A}$ in relation to the fixed part,
   - at least one pair of microwave guide inputs, one of which is positioned in the fixed part while the other is positioned in the rotating part, these microwave guide inputs being coupled to each other by a coaxial link placed in an axial conduit going through the fixed and rotating parts along the rotation axis $\Delta$ said coaxial link being provided with a conductive core that has a first end fixed in the rotating part and a second end sliding rotationally in the fixed part, wherein said combined microwave and optic rotary joint further includes:
   - an optic fiber fixedly joined to the rotating part, that penetrates said rotating part and goes through the conductive core of the coaxial link in the longitudinal direction along a channel made along the rotational axis $\underline{A}$ in the direction of the fixed part,
   - and an optic coupling means that is fixedly joined to the fixed part and is centered on the rotation axis $\underline{A}$ facing the end of the optic fiber that is fixedly joined to the rotating part.

2. A rotary joint according to claim 1, wherein said optic coupling means includes an optic fiber fixedly joined to the fixed part, one end of which comes face to face with the end of the optic fiber fixedly joined to the rotating part.

3. A rotary joint according to claim 2, wherein two optic coupling lenses are interposed between the facing ends of the optic fibers fixedly joined to the rotating and fixed parts.

4. A rotary joint according to claim 3, wherein the optic coupling lens positioned before the end of the optic fiber fixedly joined to the rotating part is borne by a hollow rod extending the coaxial link towards the fixed part.

5. A rotary joint according to claim 4, wherein the hollow rod is constituted by an insulator sleeve fitted by its end into the coaxial link, and a hollow tip fitted by its end into the insulator sleeve and fixed to it by a clamping collar.

6. A rotary joint according to claim 5, wherein the hollow tip, fitted by its end into the insulator sleeve extending the coaxial link, encloses a tubular centering part that guides the end of the optic fiber fixedly joined to the rotating part on the axis of said optic coupling lens.

7. A rotary joint according to claim 3, wherein the optic coupling lens, positioned in front of the end of the optic fiber fixedly joined to the fixed part, is borne by a hollow tip that is fitted into an anchoring part, fixed to the fixed part by means of a case, and encloses a tubular centering part guiding the end of the optic fiber fixedly joined to the fixed part on the axis of said optic coupling lens.

* * * * *